United States Patent
Maldonado et al.

(10) Patent No.: US 7,251,994 B2
(45) Date of Patent: Aug. 7, 2007

(54) TIRE PRESSURE STATUS INDICATING DEVICE

(75) Inventors: Brandon Maldonado, 19862 LeMans Cir., Yorba Linda, CA (US) 92886; William D. Rattan, Roseville, CA (US)

(73) Assignee: Brandon Maldonado, Yorba Linda, CA (US)

( * ) Notice: Subject to any disclaimer, the term of this patent is extended or adjusted under 35 U.S.C. 154(b) by 0 days.

(21) Appl. No.: 11/268,173

(22) Filed: Nov. 7, 2005

(65) Prior Publication Data

US 2006/0059983 A1  Mar. 23, 2006

Related U.S. Application Data

(63) Continuation-in-part of application No. 10/817,219, filed on Apr. 1, 2004, now abandoned.

(51) Int. Cl.
*G01M 7/02* (2006.01)
*B60C 23/02* (2006.01)

(52) U.S. Cl. .................. 73/146.8; 73/146; 73/146.2

(58) Field of Classification Search ........ 73/146–146.8
See application file for complete search history.

(56) References Cited

U.S. PATENT DOCUMENTS

| | | | |
|---|---|---|---|
| 1,079,704 A | 11/1913 | Hathaway | |
| 1,176,338 A | 3/1916 | Bromberg | |
| 1,214,714 A | 2/1917 | Harrsion et al. | |
| 1,539,030 A | 5/1925 | Sweetland | |
| 1,594,386 A | 8/1926 | Stuart | |
| 1,807,752 A | 6/1931 | Poster | |
| 3,906,988 A | 9/1975 | Mottram | |
| 3,969,936 A | 7/1976 | Lindsay | |
| 5,535,623 A | 7/1996 | Heyns | |
| 6,293,297 B1 | 9/2001 | Maldonado et al. | |
| 6,588,264 B1 * | 7/2003 | Johnson | 73/146.8 |
| 6,588,265 B1 * | 7/2003 | Roberson | 73/146.8 |
| 2004/0025581 A1 * | 2/2004 | Miller | 73/146 |

* cited by examiner

*Primary Examiner*—Edward Lefkowitz
*Assistant Examiner*—Jermaine Jenkins
(74) *Attorney, Agent, or Firm*—Gene Scott; Patent Law & Venture Group

(57) ABSTRACT

A tire pressure indicating apparatus has a plurality of interconnected concentric cylindrical parts including, a base, a flexible diaphragm providing an annular U-shaped wall, a valve body, an indicator sleeve, a cover and a spring, the spring compressively engaged between the cover and the indicator sleeve, such that a pressure differential across the diaphragm acts in opposition to the spring to move the indicator sleeve axially so as to display a colored surface of the sleeve through a window in the cover, or an alternate color uncovered by sleeve movement.

10 Claims, 3 Drawing Sheets

TIRE PRESSURE STATUS INDICATING DEVICE

RELATED APPLICATIONS

This is a Continuation-In-Part application of U.S. patent application Ser. No. 10/817,219, filed Apr. 1, 2004, now abandoned which is incorporated herein by reference.

BACKGROUND

1. Field of the Present Disclosure

This invention relates generally to air pressure level indicators for tires, and more particularly to such an indicator capable of distinguishing between adequate, and under inflated conditions in a tire and of visually indicating such status.

2. Description of Related Art

Maldonado et al, U.S. Pat. No. 6,293,297 teaches a tire pressure indicator mounted onto the fill stem of a tire and provides a window for indicating if the tire has adequate pressure or not. The indicator show adequate, marginal and underinflated conditions by color bands opposite the window. The pressure indicator may be permanently mounted onto the tire and used to fill the tire and maintain pressure in the tire. As the tire is filled the indicator moves from one color band to the next until the indicator shows that adequate pressure has been attained whereupon the hose may be disconnected. Lindsay, U.S. Pat. No. 3,969,936 describes an inflation valve gauge including a tubular stem having an inner end connected to a pressurized chamber such as formed by a tire, and an outer end provided with an inflation valve; die stem being surrounded by a special, helically wound Bourdon type pressure gauge tube, having an axially inner end penetrating a wall of the tubular stem and an outer end having a pointer overlying an axially directed scale plate; the gauge tube being surrounded by a sleeve which supports the scale plate and is joined to the stem axially inward from the gauge tube; the convolutions of the gauge tube being disposed in close proximity, the confronting wall surfaces of the stem and sleeve being in close proximity to the convolutions of the gauge tube to restrain the gauge tube against extreme mechanical forces tending to damage the gauge tube. Heyns, U.S. Pat. No. 5,535,623 describes a tire pressure indicator which has a screw-threaded socket for long term but removable association with a tire valve. The body of the indicator houses a movable operator member; actuator member; and resilient member located between the operator member and actuator member. The arrangement is such that the actuator member is held in a "test' position by the resilient means which is compressed when the actuator member is moved to a "test" position. The degree of compression and resilience of the resilient means are arranged such that the air release pin of the tire valve is depressed only in the event of air pressure in the tire being inadequate to counter the force exerted thereon through the resilient means. The sound of the air escaping in the "test' position is indicative of a low tire pressure. Mottram, U.S. Pat. No. 3,906,988 describes a combined valve and wheel rim gauge for indicating visually whether the air pressure within the tire is adequate for safe operation. The device includes a flexible diaphragm which controls the movement of an indicating sleeve under varying conditions of internal air pressure to provide a continuous reading of under inflation, proper inflation and over inflation. Poster, U.S. Pat. No. 1,807,752 describes an automobile tire pressure gauge or indicator, comprising a casing closed at its outer end and having sight openings intermediate its ends. The gauge has a base portion connected to the inner end of the casing. The base portion has an inwardly extending threaded part adapted to detachably engage with a valve stem. 'Me base portion has an opening therethrough registering with the valve stem and having a bar adapted to engage the pin of the valve for maintaining the same open when the base portion is in position. A transparent cylinder mounted in the casing and having an opening through its inner end receives air from the base potion. A piston slidably mounted in the transparent cylinder which has surface portions of different colors is adapted to register as the against the outer end of the piston urges the latter inwardly against the air pressure. Stuart, U.S. Pat. No. 1,594,386 describes a removable locked indicating valve stem comprises in combination an expandable air chamber in direct connection with the air in a pneumatic tire and in part a section of valve stem with metallic walls and in part a section of valve stem lined with a flexible rubber member actuated by a pressure spring opposed to the compressed air, an indicating member on the chamber's movable end and actuated by the spring indicating the variance of air pressure in the air chamber, a base member connected in juxtaposition with the pneumatic tire, a shut-off check valve in the base member, a removable tubular member thread-ably secured to said base member, and enlarged flange on the removable tubular member at its connecting end adapted to prevent it passing through the valve stem hole in the metal rim of the tire wheel from the tire side, and indicating scale on said tubular member in juxtaposition with said indicating member and adapted for indicating the pounds pressure, a sliding tubular member loosely mounted within the outer part of the removable tubular member and adapted to be forced across the opening in the metal-walled part of the air chamber by the pressure of air from the supply tube so as to conduct the supply of air to the inlet connecting with the pneumatic tire. Sweetland, U.S. Pat. No. 1,539,030 describes a pressure indicating device comprising a casing, a sleeve movable within said casing and provided with graduations, a tube having means embedded therein for preventing lateral while permitting longitudinal extension of the tube, and a coiled spring located in the annular space between the sleeve and the tube and arranged to resist the longitudinal extension of the latter. Gilbough, U.S. Pat. No. 1,309,517 describes in combination with a vehicle wheel and an inflatable tire thereon, a movable pressure operated registering means in operative connection with the tire, and an arm connected to the wheel rim to be moved by movement of said means to project beyond the wheel and strike a stationary part of the vehicle when the tire is not properly inflated. Harrison et al., U.S. Pat. No. 1,214,714 describes a tire pressure gauge, comprising the combination with the rim of a wheel and the inner tube of a tire, of a bushing tube secured to the rim and passing through the aperture in the same, a tire valve member endwise movable in the bushing tube, means for clamping the inner end of the member to the inner tube, the tire valve member adapted to be pressed outwardly by the inflation of the inner tube, resilient means opposing the outward movement and a tire inflating valve within the tire valve member, the tire valve member having a passage through the same controlled by the tire inflating valve whereby the inner tube of the tire may be inflated through the tire valve member. Bromberg, U.S. Pat. No. 1,176,338 describes combined tire valve and pressure gauge, the combination of a base piece, an intermediate piece mounted therein provided with a valve seat at its lower end and a central hole longitudinally therethrough serving as an air conductor and with a chamber disposed in one side thereof with a POM the port and central hole terminating in the valve seat, and air valve covering the lower end of the central hole and the port in the valve seat, a plunger reciprocally mounted in the chamber, yielding means engaging with the plunger and means for indicating the pressure on the plunger in connection with the plunger thereon provided with a curved valve seat with ports leading directly therefrom to the inner surface of said cylindrical piece, a valve mounted in the curved seat, and air conducting tube secured in the cylindrical piece, a valve stem mounted in the tube extending through the outer surface of the cylindrical piece, means for holding the valve seated, a plunger reciprocally mounted in the cylindrical piece, a pressure indicating means in connection therewith and spring for regulating the movement of said plunger. Hathaway, U.S. Pat. No. 1,1079,704 describes a tire valve barrel having eccentric and parallel air and gage tube bores, the lower end of the latter bore having a primary and an eccentric secondary counter-bore and the upper end of the latter bore terminating short of the tip of the barrel, a mercury tube fitting in the bore and having its outer end closed and seated against the upper end of the bore, the lower end of the tube being open and entering the primary counter-bore, a packing ring in the counter-bore around the end of the tube, a diaphragm having its edges thickened and seated against the shoulder formed by the secondary counter-bore so as to space the diaphragm from the shoulder, and a binding ring screw-threaded into the secondary counter-bore and bearing against the thickened edge of the diaphragm to retain the diaphragm in position, a portion o the valve being cut away to expose the tube and bearing graduations.

Our prior art search with abstracts described above teaches the use of a moving indicator to monitor tire air pressure, but does not teach a moving cylindrical piston mounted within an annular U-shaped diaphragm to provide a very simple and yet reliable and inexpensive tire valve with pressure indicator. The present invention fulfills these needs and provides further related advantages as described in the following summary.

SUMMARY

This disclosure teaches certain benefits in construction and use which give rise to the objectives described below.

The presently described apparatus is a tire pressure indicator specifically designed for threaded engagement with a Schrader valve stem. A Schrader valve is a type of valve fitting that opens when depressed. Schrader valves are commonly used in tire valve stems, on air conditioning hoses and on the fuel rails of many fuel injection systems. The present indicator is designed to be threaded permanently onto a Schrader valve stem of an automobile tire. The indicator has its own Schrader valve for allowing air to be admitted into the tire through the indictor. In use the indicator presents a green color through a transparent window when tire pressure is satisfactory, and presents a red color when it is not. As tire pressure drops below the satisfactory level the red color is slowly revealed while the green color is slowly covered until all red and no green is visible.

A primary objective of the present invention is to provide a pressure indicator having advantages not taught by the prior art.

A further objective is to provide an indicator that is able to display tire air pressure status depending upon pressure changes in the tire.

A still further objective is to provide such an indicator that is able to be used for admitting air into a tire.

A yet further objective is to provide such an indicator that is able to be mounted on a tire replacing a conventional air valve stem.

Other features and advantages of the described apparatus and method of use will become apparent from the following more detailed description, taken in conjunction with the accompanying drawings, which illustrate, by way of example, the principles of the presently described apparatus and method of its use.

BRIEF DESCRIPTION OF THE DRAWINGS

The accompanying drawings illustrate at least one of the best mode embodiments of the present apparatus and method of it use. In such drawings.

DETAILED DESCRIPTION

Figures 1, 2:
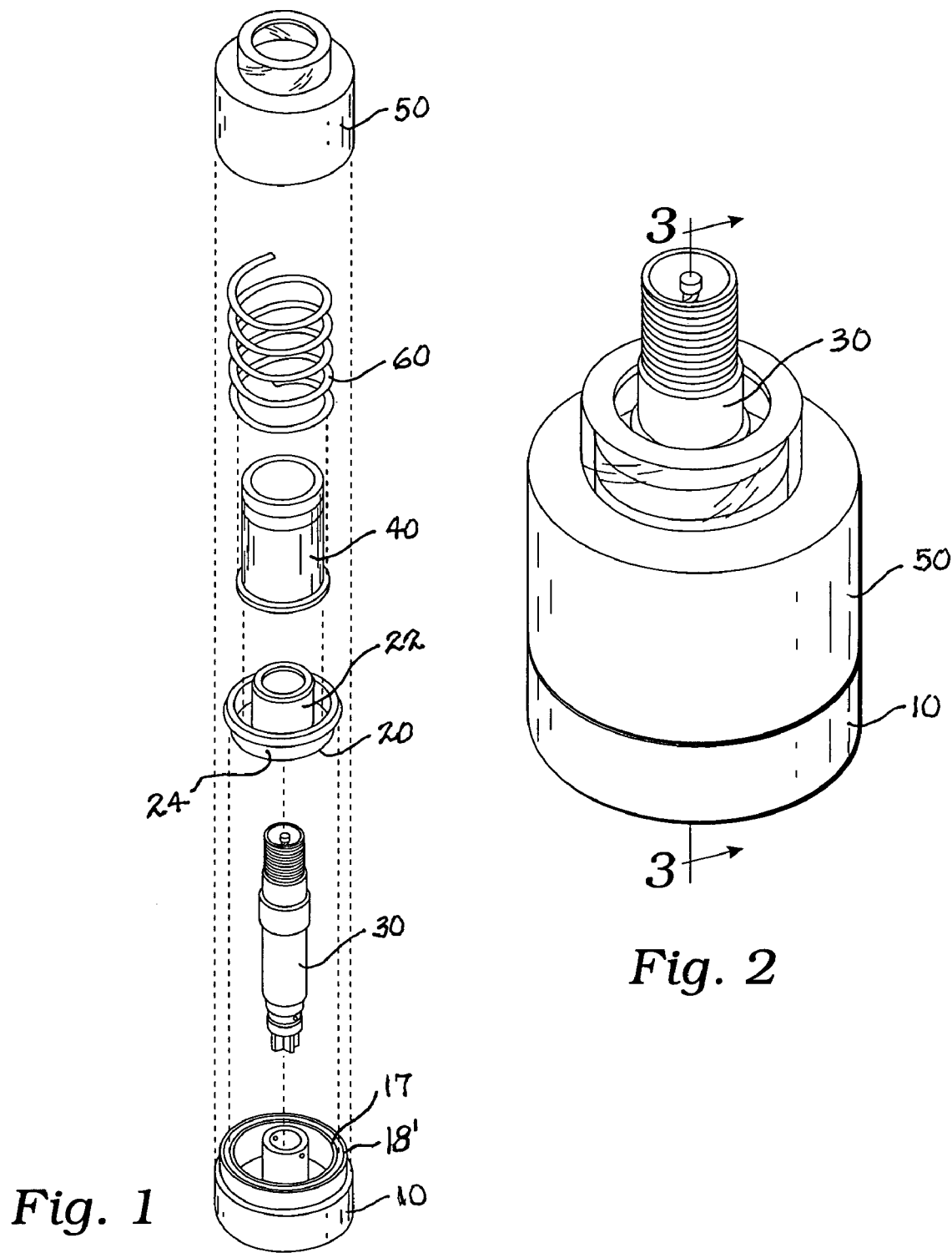
FIG. 1 is a perspective expanded view of one embodiment of the presently described and claimed apparatus shown in a reduced scale.
FIG. 2 is a perspective view thereof as assembled.
Figures 3, 4:
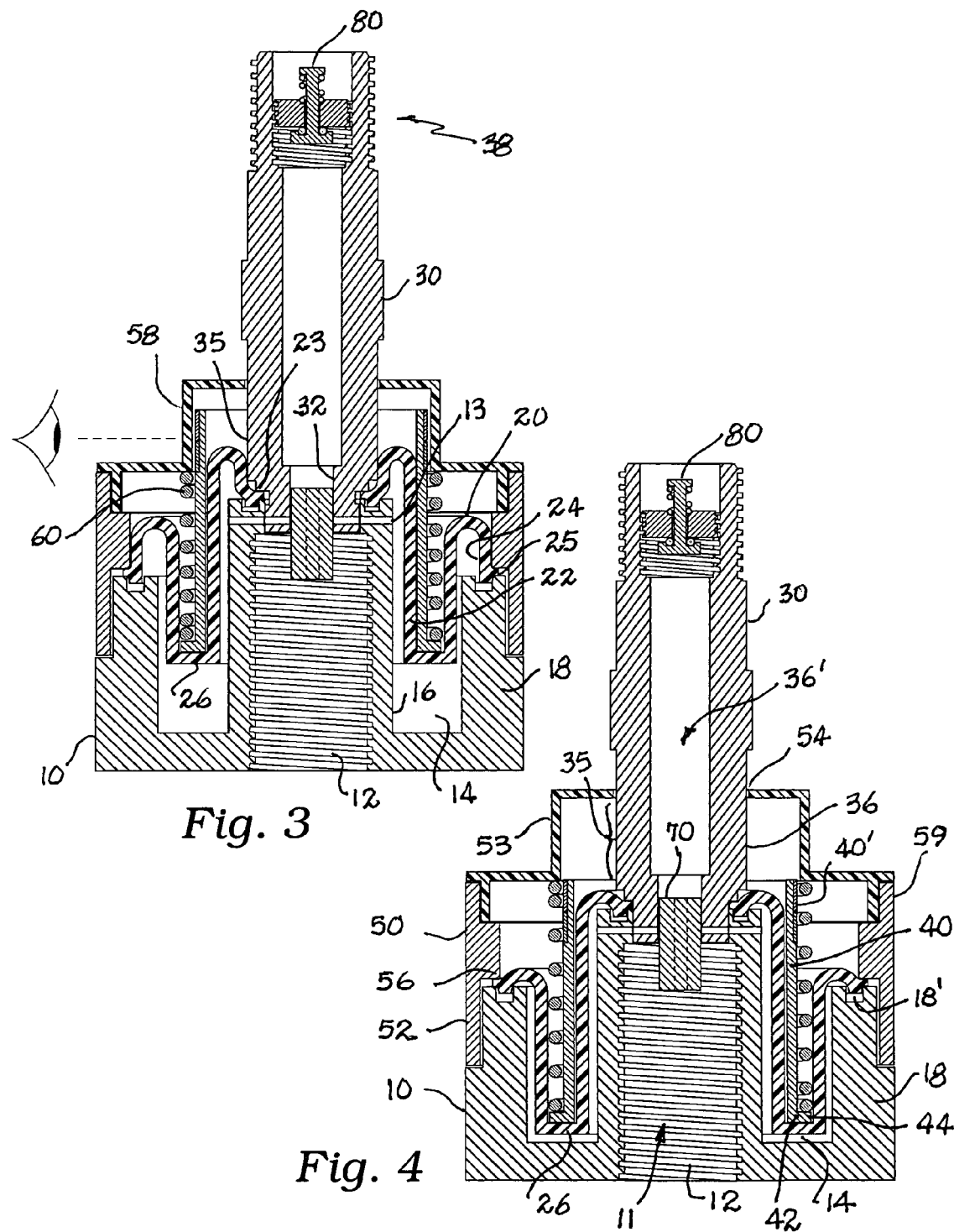
FIGS. 3 and 4 are vertical cross sections thereof taken along line 3-3 in FIG. 2 showing an indicator in a raised position and in a lowered position respectively.

The above described drawing figures illustrate the described apparatus and its method of use in at least one of its preferred, best mode embodiment, which is further defined in detail in the following description. Those having ordinary skill in the art may be able to make alterations and modifications what is described herein without departing from its spirit and scope. Therefore, it must be understood that what is illustrated is set forth only for the purposes of example and that it should not be taken as a limitation in the scope of the present apparatus and method of use.

As shown in FIGS. 1-4 a first embodiment of the present apparatus is adapted for being threaded onto a valve stem of an automotive tire. A plurality of concentric cylindrical parts are assembled including a base 10 of a rigid structural material having an internal female thread 12 and an annular guide groove 14 which is positioned between opposing inner 16 and outer 18 walls. The inner wall 16 providing an annular inner sealing groove 17, while the outer wall 18 providing an annular outer sealing groove 18'. A flexible diaphragm 20 of rubber or a rubber like material, is positioned within the guide groove 14 and is preferably configured so that it does not seal at the bottom of the groove 14. This is preferably enabled by forming radially oriented high points or ridges (not shown) along the portion of the diaphragm 20 where it contacts the bottom of the groove so that the entire exterior of the diaphragm 20 is exposed to a controlled air pressure (tire pressure) while the interior of the diaphragm 20 is exposed to atmospheric air pressure. The diaphragm 20 has an annular inner diaphragm wall 22 terminating within the inner sealing groove 17 and an annular outer diaphragm wall 24 terminating within the outer sealing groove 18'. A circular portion 26 of the diaphragm 20 joins the inner 22 and outer 24 diaphragm walls. As clearly shown in FIGS. 3 and 4, the terminal lips of the diaphragm walls are ribbed so as to be compressed into the sealing grooves 17 and 18' and pinned within these grooves by other elements of the present apparatus as will be described.

A valve body 30, preferably of brass, is engaged at a proximal end 32 thereof within the base 10, and an annular lip 23 the valve body 30 secures a terminal end of the inner diaphragm wall 22 within the inner sealing groove 17.

One end 42 of an axially movable indicator sleeve 40 is positioned between the inner and outer walls 22, 24 respectively of the diaphragm 20.

A cover 50 is engaged at one end 52 thereof with the base 10 and encloses the diaphragm 20, the indicator sleeve 40 and a medial portion 36 of the valve body 30. A central hole 54 in an opposing end 53 of the cover 50 is large enough to pass a terminal end 36 of the valve body 30 and this hole 54 allows for air flow into and out of the cover 50. An annular lip 56 of the cover 50 secures a terminal end 25 of the outer diaphragm wall 24 within the outer sealing groove 18'.

A coil spring 60 is compressively engaged between the cover 50 and an outwardly directed flange 44 of the indicator sleeve 40. The inner wall 16 of the base 10 provides at least one, and preferably two, radially directed bores 13 which join a central space 11 of the base 10 with the guide groove 14, thereby exposing one side of the diaphragm 20 to the air pressure level within the central space 11 of the base 10 as well as the interior space 36' of the valve body 30. A pin release 70 is engaged, preferably by being press fitted within the valve body 30. The pin release 70 extends into adjacency with the female thread 12 so that it is placed in an appropriate position for opening a Schrader valve within a tire fill stem (not shown) that can be engaged with the female thread 12. A Schrader air valve 80 is engaged within a distal end 38 of the valve body 30 for accepting air flow into the valve body 30 and central space 11 of the base 10 whereby, when air pressure within the base 10 and valve body 30 is greater than atmospheric air pressure, the diaphragm 20 depresses the spring 60 to drive the indicator sleeve 40 into a transparent portion 58 of the cover 50; and when air pressure within the base 10 and valve body 30 is below atmospheric air pressure, the spring 60 drives the indictor sleeve 40 into an opaque portion 59 of the cover 50 thereby revealing a medial portion 35 of the valve body 30 visible through the transparent portion 58 of the cover 50.

Preferably, an exterior surface of the indicator sleeve 40 provides a green appearance which may be provided by a colored sleeve 40' or may be a painted surface or any other means for colorization; and the medial portion 35 of the valve body 30 provides a visually red exterior surface, again, by any colorizing means desired.

Figure 5:
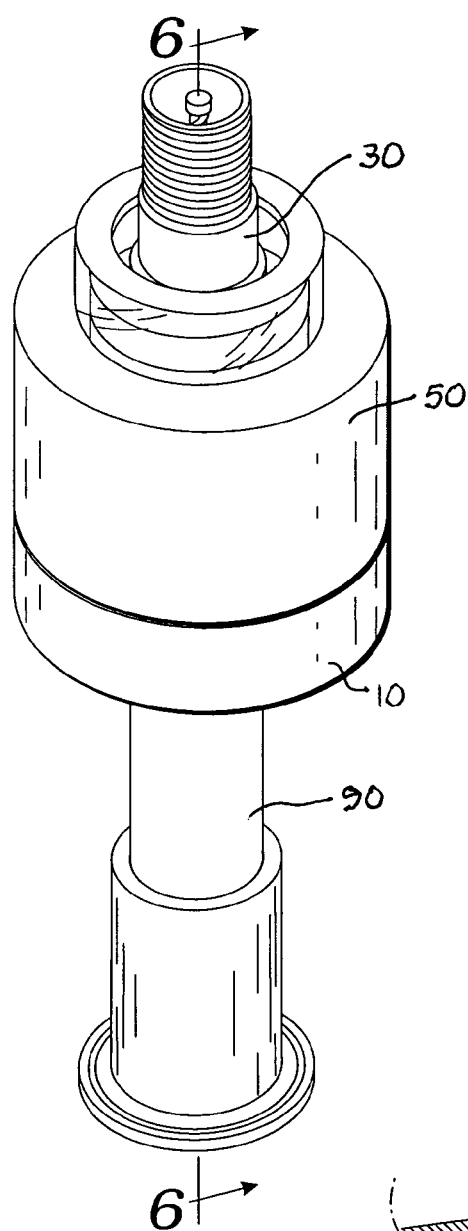
FIG. 5 is a perspective view of a further embodiment of the apparatus.
Figure 6:
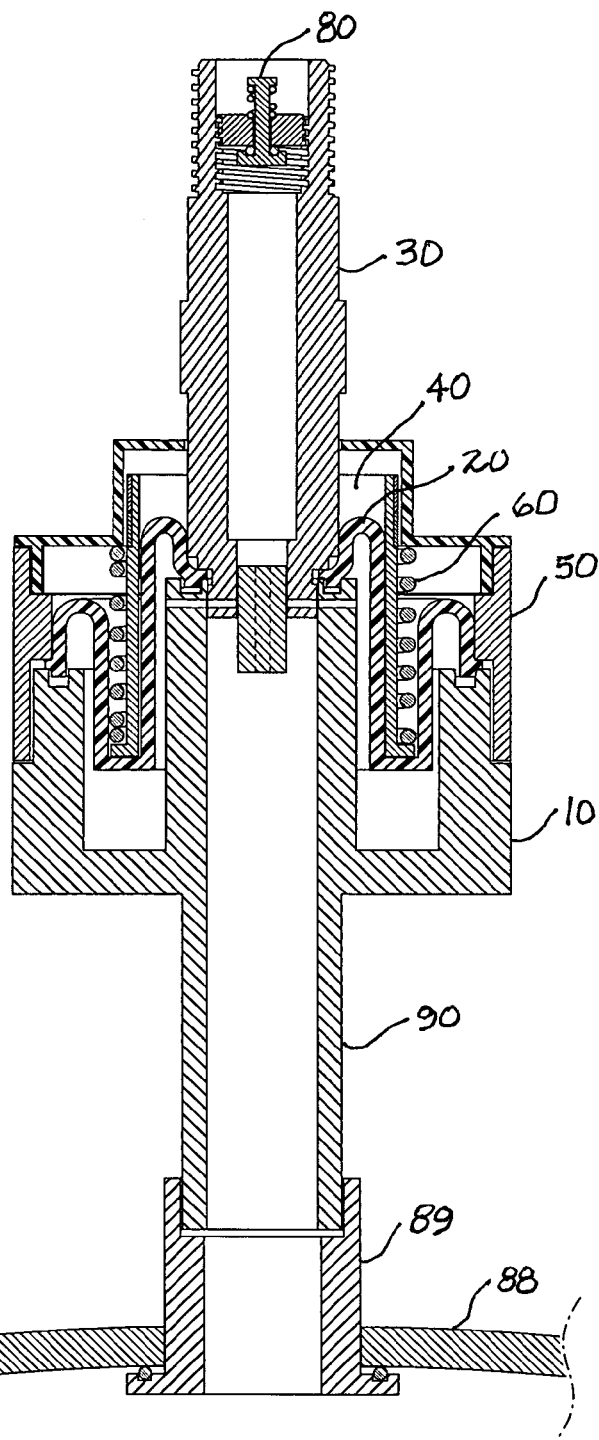
FIG. 6 is a vertical cross-section taken along line 6-6 in FIG. 5.

FIGS. 5 and 6 illustrate the present invention in a further embodiment wherein the apparatus is mounted using an elongated tubular body 90 within a rim adaptor 89 directly onto a wheel rim 88 and serves to indicate adequate tire air pressure as well as a means for inletting air into the tire and for releasing air from the tire.

It is noted that the valve stem 30 is press-fitted into the body 10 and the cover 50 is also press fitted over the body 10. Likewise, the tubular body 90 is press-fitted into the rim adaptor 89. Other means for fixedly and permanently engaging these parts with each other may be used as is well known in the art.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A tire pressure indicating apparatus comprising: a plurality of concentric cylindrical parts including:
   a) a base providing an internal female thread and an annular guide groove positioned between opposing inner and outer walls, to inner wall providing an annular inner sealing groove, the outer wall providing an annular outer sealing groove;
   b) a flexible diaphragm positioned within the guide groove with an annular inner diaphragm wall terminating within the inner scaling groove and an annular outer diaphragm wall terminating within the outer sealing groove;
   c) a valve body engaged at a proximal end thereof within the base, an annular lip of the valve body securing the inner diaphragm wall within the inner sealing groove;
   d) an axially movable indicator sleeve positioned between the inner and outer walls of the diaphragm;
   e) a cover engaged with the base, the cover enclosing the diaphragm, the indicator sleeve and a medial portion of the valve body, an annular lip of the cover securing the outer diaphragm wall within the outer sealing groove;
   f) a coil spring compressively engaged between to cover and a flange of the indicator sleeve;
   the inner wall of the base providing a bore joining a central space of the base with the guide groove, thereby exposing one side of the diaphragm to air pressure within the central space of the base and an interior space of the valve body; the apparatus further comprising a pin release engaged within the valve body and extending in adjacency to the female thread in a position for opening a valve threadedly engaged with the female thread; and an air valve engaged within a distal end of the valve body for accepting air flow into the valve body and central space of the base; whereby, with air pressure within the base and valve body superior to atmospheric air pressure, the diaphragm depresses the spring to drive the indicator sleeve into a transparent portion of the cover; and whereby, with air pressure within the base and valve body inferior to atmospheric air pressure, the spring drives the indictor sleeve into an opaque portion of the cover thereby revealing a medial portion of the valve body visible through the transparent portion of the cover.

2. The apparatus of claim 1 wherein the indicator sleeve provides a visually green exterior surface.

3. The apparatus of claim 1 wherein the medial portion of the valve body provides a visually red exterior surface.

4. The apparatus of claim 1 wherein a distal end of the valve body provides an exterior thread.

5. A tire pressure indicating apparatus comprising: a plurality of concentric cylindrical parts including:
 a) a base providing a guide groove;
 b) a flexible diaphragm positioned within the guide groove, the diaphragm providing an annular U-shaped wall;
 c) a valve body engaged with the base;
 d) an indicator sleeve having one end thereof positioned within the U-shaped wall of the diaphragm;
 e) a cover enclosing the diaphragm, the indicator sleeve and a medial portion of the valve body;
 f) a coil spring compressively engaged between the cover and a flange of the indicator sleeve; wherein
a pressure differential across the diaphragm is balanced by the spring so as to move the indictor sleeve axially.

6. The apparatus of claim 5 wherein the indicator sleeve provides a visually green exterior surface visible trough a transparent portion of the cover with the spring depressed.

7. The apparatus of claim 5 wherein the valve body provides a visually red exterior surface visible through a transparent portion of the cover with the spring extended.

8. A tire pressure indicating apparatus comprising: a plurality or interconnected concentric cylindrical parts including, a base, a flexible diaphragm providing an annular U-shaped wall, a valve body, an indicator sleeve positioned within the U-shaped wall of the flexible diaphragm, a cover and a spring, the spring compressively engaged between the cover and the indicator sleeve, such that a pressure differential across the diaphragm acts in opposition to the spring to move the indicator sleeve axially.

9. The apparatus of claim 8 wherein the indicator sleeve provides a visually green exterior surface visible trough a transparent portion of the cover with the spring depressed.

10. The apparatus of claim 8 wherein the valve body provides a visually red exterior surface visible through a transparent portion of the cover with the spring extended.

* * * * *